J. LYON.
Peach and Plum Pitter.

No. 218,992.      Patented Aug. 26, 1879.

Witnesses:
W. Floyd Duckett
W. F. Clark

Inventor
Jacob Lyon
per J. L. Borne
Attorney.

UNITED STATES PATENT OFFICE.

JACOB LYON, OF PLACERVILLE, CALIFORNIA.

IMPROVEMENT IN PEACH AND PLUM PITTERS.

Specification forming part of Letters Patent No. 218,992, dated August 26, 1879; application filed April 4, 1879.

*To all whom it may concern:*

Be it known that I, JACOB LYON, of Placerville, county of El Dorado, State of California, have invented an Improved Peach and Plum Pitting Machine; and I do hereby declare that the following is a full, clear, and exact description thereof, reference being had to the drawings accompanying this specification and forming a part of the same.

My invention has reference to an improved machine for pitting peaches, plums, apricots, and nectarines, and at the same time cutting the fruit into halves or quarters.

Figure 1:
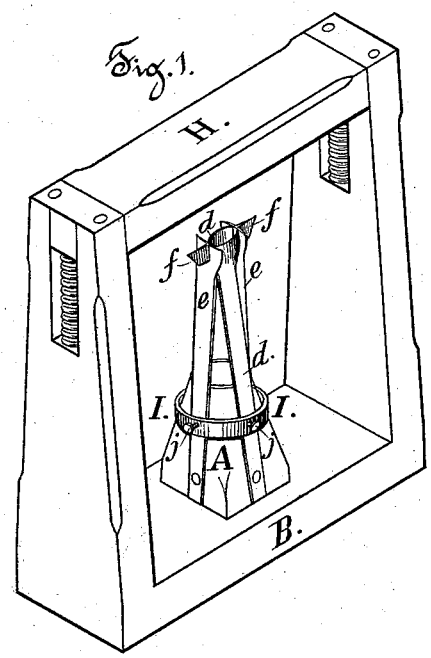
Figure 2:
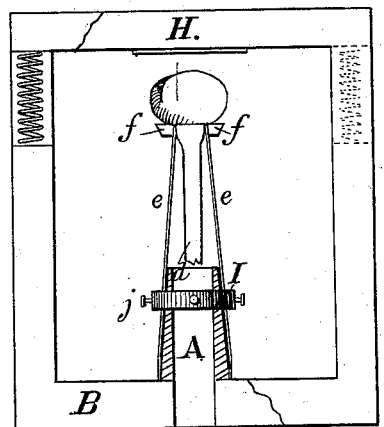

Referring to the accompanying drawings, Figure 1 is a perspective, and Fig. 2 an elevation, of my improved fruit-pitter.

Let A represent a hollow cylinder, which is secured vertically upon a table, frame, or other support, B, so that the passage through it will extend below the table or support. This attachment can be made by forming a tenon on the lower end of the cylinder, and then securing the tenon in the corresponding hole or mortise in the table-top or frame, so that the tenon will pass through the mortise, while the shoulder of the tenon rests upon the table around the mortise; but this is immaterial, as various means may be employed for attaching the cylinder to the table. This arrangement, however, is simple, and forms a solid seat for the cylinder, and, at the same time, admits of its being readily removed when desired. The shape of that portion of the cylinder which projects above the table is not material; but I prefer to make it conical, for the reason hereinafter stated. On opposite sides of this cylinder I secure two upward-projecting steel springs, $d\ d$, of equal height, which are of sufficient length to bring their upper ends to within a short distance of each other, the conical shape of the cylinder causing them to converge toward their upper ends. The upper end of each of these springs is made about as wide as the length of an ordinary peach-stone, and these widened ends are curved transversely, so as to be concave on the inside. The upper edges of these widened ends are sharpened to a knife-edge. These cutting-points I therefore call the "side cutters."

On the other two quarters of the cylinder I secure two other upward-projecting steel springs, $e\ e$, the upper ends of which bear against the side edges of the widened ends of the springs $d\ d$, and are of the same height. The ends of these springs are narrower than the side cutters, and are concaved and sharpened in the same manner. I therefore call them the "end cutters."

Projecting from the outside face of each end cutter is a horizontal blade, $f$, the upper edge of which is sharpened to a knife-edge.

The concavity of the side cutters and end cutters in the arrangement above described forms an oval opening much the shape of a peach or plum pit. The springs $d\ e$ are sufficiently flexible to yield outward to any inside pressure on their upper or cutting edges.

H is a plunger, which is arranged above the cutters so as to be forced down upon them by any suitable power.

To remove the pit from a peach or plum, the fruit is placed upon the upper ends of the cutters in such a position that its pit or stone is edgewise and lengthwise with the opening formed by the cutters. The plunger is then forced down upon the peach or plum, so as to drive it against the cutters. The pressure upon the stone or pit forces the springs apart, so that the edges cut around the pit, while the radial knives $f$ separate the fruit into two equal parts. The pit is forced through the opening formed by the set of cutting-edges, and drops down through the cylinder into a receptacle under the table, while the fruit drops on the outside of the cylinder, separated into halves by the knives $f$ and pit-cutters. The upper edges of the cutters are slightly flared outward, so that the pressure on the pit will force them apart easily, and cause them to cut close around the pit.

Other radial knives could be secured to the side cutters, so as to cut the fruit into quarters or sixths, if desired.

To regulate the tension or flexibility of the springs and adjust the size of the opening, I employ a ring or band, I, which slips down over the springs. Opposite each spring I arrange a set-screw, $j$, so that by raising or lowering the band and setting the screws up against the springs their flexibility can be increased or diminished and the size of the hole regulated for a larger or smaller pit.

By means of this machine I can remove the pits from peaches, plums, apricots, and nectarines with great facility, and, at the same time, cut the fruit into halves or quarters. The pit is taken out clean, leaving only a small portion of the fruit adhering to it above and below.

Having thus described my invention, what I claim, and desire to secure by Letters Patent, is—

A fruit-pitter consisting of the upright frame B, with its base provided with a tubular cone, A, whose inner surface is arranged around an opening in said base, the spring knives or cutters $d$, flanked by the knives $e$, having the lateral endwise-disposed cutters $f$, which knives $d\ e$ are adjusted to the cone A, to permit them to converge at their cutting ends, and having a tension band, I $j$, and follower or plunger H, arranged upon springs in the frame B, substantially as and for the purpose set forth.

In witness whereof I have hereunto set my hand and seal.

JACOB LYON. [L. S.]

Witnesses:
 THOMAS FRASER,
 WM. H. DIXON.